(12) United States Patent
Canuto et al.

(10) Patent No.: US 12,385,152 B2
(45) Date of Patent: Aug. 12, 2025

(54) SYSTEM AND METHOD FOR PRODUCTION OF HYDROGEN GAS AS A FUEL SOURCE USING AN ELECTROLYSIS APPARATUS

(71) Applicants: Teresita Amponin Canuto, Mission Hills, CA (US); Dominic Amponin Canuto, Mission Hills, CA (US)

(72) Inventors: Teresita Amponin Canuto, Mission Hills, CA (US); Dominic Amponin Canuto, Mission Hills, CA (US)

( * ) Notice: Subject to any disclaimer, the term of this patent is extended or adjusted under 35 U.S.C. 154(b) by 446 days.

(21) Appl. No.: 17/903,180

(22) Filed: Sep. 6, 2022

(65) Prior Publication Data

US 2022/0411946 A1 Dec. 29, 2022

Related U.S. Application Data

(63) Continuation-in-part of application No. 17/300,198, filed on Apr. 12, 2021, now abandoned.

(51) Int. Cl.
| | |
|---|---|
| *C25B 15/08* | (2006.01) |
| *C25B 1/04* | (2021.01) |
| *C25B 1/50* | (2021.01) |
| *C25B 9/17* | (2021.01) |
| *C25B 9/60* | (2021.01) |
| *C25B 11/043* | (2021.01) |

(52) U.S. Cl.
CPC ............... *C25B 15/08* (2013.01); *C25B 1/04* (2013.01); *C25B 1/50* (2021.01); *C25B 9/17* (2021.01); *C25B 9/60* (2021.01); *C25B 11/043* (2021.01)

(58) Field of Classification Search
CPC .............. C25B 1/02; C25B 1/04; C25B 15/08
See application file for complete search history.

(56) References Cited

U.S. PATENT DOCUMENTS

| | | | |
|---|---|---|---|
| 6,610,193 B2 | 8/2003 | Schmitman et al. | |
| 7,453,164 B2 | 11/2008 | Borden et al. | |
| 8,449,735 B2 * | 5/2013 | Owens | F02B 43/10 |
| | | | 204/263 |
| 9,534,303 B2 | 1/2017 | Kelly et al. | |
| 11,041,246 B2 | 6/2021 | Mohri et al. | |
| 2003/0024489 A1 | 2/2003 | Balan et al. | |
| 2008/0202942 A1 | 8/2008 | Wilkinson et al. | |
| 2012/0055805 A1 * | 3/2012 | Kirchoff | C25B 1/04 |
| | | | 205/637 |
| 2015/0361569 A1 | 12/2015 | Mabie et al. | |
| 2019/0010621 A1 * | 1/2019 | Bogers | C25B 15/02 |

* cited by examiner

*Primary Examiner* — Brian W Cohen
(74) *Attorney, Agent, or Firm* — Bold IP, PLLC; Houda El-Jarrah (57) ABSTRACT

An apparatus composed of three basins of different sizes with partitions that can be raised or lowered between the basins is described. The apparatus is used for electrolysis. When a partition is lifted, it allows some extra saltwater to pass into a next basin for use in electrolysis. Carbon electrodes (e.g., mantle peridotite based-activated carbon electrodes or graphite electrodes) that are submerged in the solution (saltwater) and covered in glass tubes are attached to the positive and negative wires of a battery. The battery provides the direct electric current (DC) to power the electrolysis. The carbon electrodes serve as a catalyst to assist in the water splitting and generation of hydrogen gas, that can then be transferred via a hose to a cathode storage tube and then later to a hydrogen gas storage container to be used to power one or more devices or apparatus (e.g., stoves) as a fuel source.

17 Claims, 7 Drawing Sheets

SYSTEM AND METHOD FOR PRODUCTION OF HYDROGEN GAS AS A FUEL SOURCE USING AN ELECTROLYSIS APPARATUS

CROSS-REFERENCE TO RELATED APPLICATIONS

This application is a continuation in part application which claims priority to U.S. Non-Provisional patent application Ser. No. 17/300,198, which was filed on Apr. 12, 2021, which is incorporated by reference in its entirety.

FIELD OF REFERENCE

The present disclosure generally relates to a system and method for hydrogen gas generation via a process of electrolysis using a specialized electrolysis apparatus having a number of basins and locks.

BACKGROUND

It is well known that the rising greenhouse concentrations are significantly affecting the global temperature and caused global warming of the planet with catastrophic implications to the environment and endangering life on the planet. There is a need for the ability to obtain alternate sources of fuel that can fuel multiple types of devices with less harmful effects on the environment. Hydrogen fuel can be a type of fuel that would be less harmful to the environment, however, the issue is that pure hydrogen is not readily available on Earth in large quantities. Electrolysis is one way in which hydrogen and hydrogen fuel may be produced by separating hydrogen from oxygen in water. While there has been research on implementing electrolysis on an industrial scale, there are not existing methods and devices that can create hydrogen fuel in an average person's home or dwelling using electrolysis without using excessive use of fossil fuels that still cause a harmful effect on the environment. Accordingly, there is a need for an apparatus and system for hydrogen fuel to be created using electrolysis made available to average consumers around the world.

SUMMARY

In a non-limiting embodiment, the present description includes a method for hydrogen gas generation by water electrolysis. In a non-limiting embodiment, the method for hydrogen gas generation by electrolysis may include providing an electrolysis apparatus, wherein the electrolysis apparatus comprises a first basin, a second basin, and a third basin. The electrolysis apparatus further comprises a first partition and a second partition, whereby the first partition separates the first basin from the second basin, and the second partition separates the second basin from the third basin, whereby the first basin is elevated above the second basin and the second basin is elevated above the third basin. The third basin further comprises a first carbon electrode, wherein the first carbon electrode is an anode and a second carbon electrode, wherein the second carbon electrode is a cathode. The electrolysis apparatus further comprises a first container covering the first carbon electrode and a second container covering the second carbon electrode, wherein the first container and the second container are separate from each other. Further, a cathode storage tube is connected to the second container by a conduit, whereby the conduit comprises a stopcock positioned near an entrance of the cathode storage tube, whereby the conduit connects an exit opening of the second container covering the second carbon electrode to the entrance of the cathode storage tube. Further, a power source is electrically connected to the first carbon electrode and to the second carbon electrode when located in the third basin and beneath the first container and the second container.

The method may further include connecting a positive end of the power source to one end of the first carbon electrode located in the third basin, connecting a negative end of the power source to one end of the second carbon electrode located in the third basin, providing saltwater to the third basin containing the first carbon electrode covered by the first container and the second carbon electrode covered by the second container and submerging the first carbon electrode and the second carbon electrode with the saltwater, and powering on the power source in order to apply direct current for electrolysis to occur in the electrolysis apparatus. As a result of the powering on the power source and the electrolysis occurring in the electrolysis apparatus, the method may further comprise producing oxygen gas as a result of the oxidation reaction and producing hydrogen gas as a result of the reduction reaction. After the electrolysis has occurred the first container covering the first carbon electrode contains the oxygen gas and wherein the second container covering the second carbon electrode contains the hydrogen gas. The method may further include transferring the hydrogen gas to the cathode storage tube through the conduit upon opening or activating the stopcock and collecting the hydrogen gas in the cathode storage tube until the cathode storage tube is full of the hydrogen gas produced from the electrolysis apparatus.

The method may further include storing the hydrogen gas in the cathode storage tube and connecting a portable gas tank to the cathode storage tube and transferring the hydrogen gas from the cathode storage tube to the portable gas tank. Further, the method may include connecting the portable gas tank to another device or apparatus or item that can use the hydrogen gas in the portable gas tank as a fuel source. The method may further include filling the first basin with water, lifting the first partition so that a first amount of water fills the second basin, adding the saltwater from a measuring tube to the second basin so that the saltwater and the first amount of the water mix together to form a second amount of saltwater, and lifting the second partition so that the second amount of the saltwater fills the third basin in order to provide a correct amount of the saltwater within the third basin for the electrolysis to occur. In a non-limiting embodiment, the measuring tube is coupled to the second basin with a conduit. In a non-limiting embodiment, the cathode storage tube comprises an auto-shut off mechanism that becomes triggered when the cathode storage tube is full of the hydrogen gas. In a non-limiting embodiment, the first carbon electrode and the second carbon electrode comprise mantle peridotite based-activated carbon electrodes or graphite electrodes.

The features and advantages described in this summary and the following detailed description are not all-inclusive. Many additional features and advantages will be apparent to one of ordinary skill in the art in view of the drawings, specification, and claims thereof.

DETAILED DESCRIPTION

Figure 1:
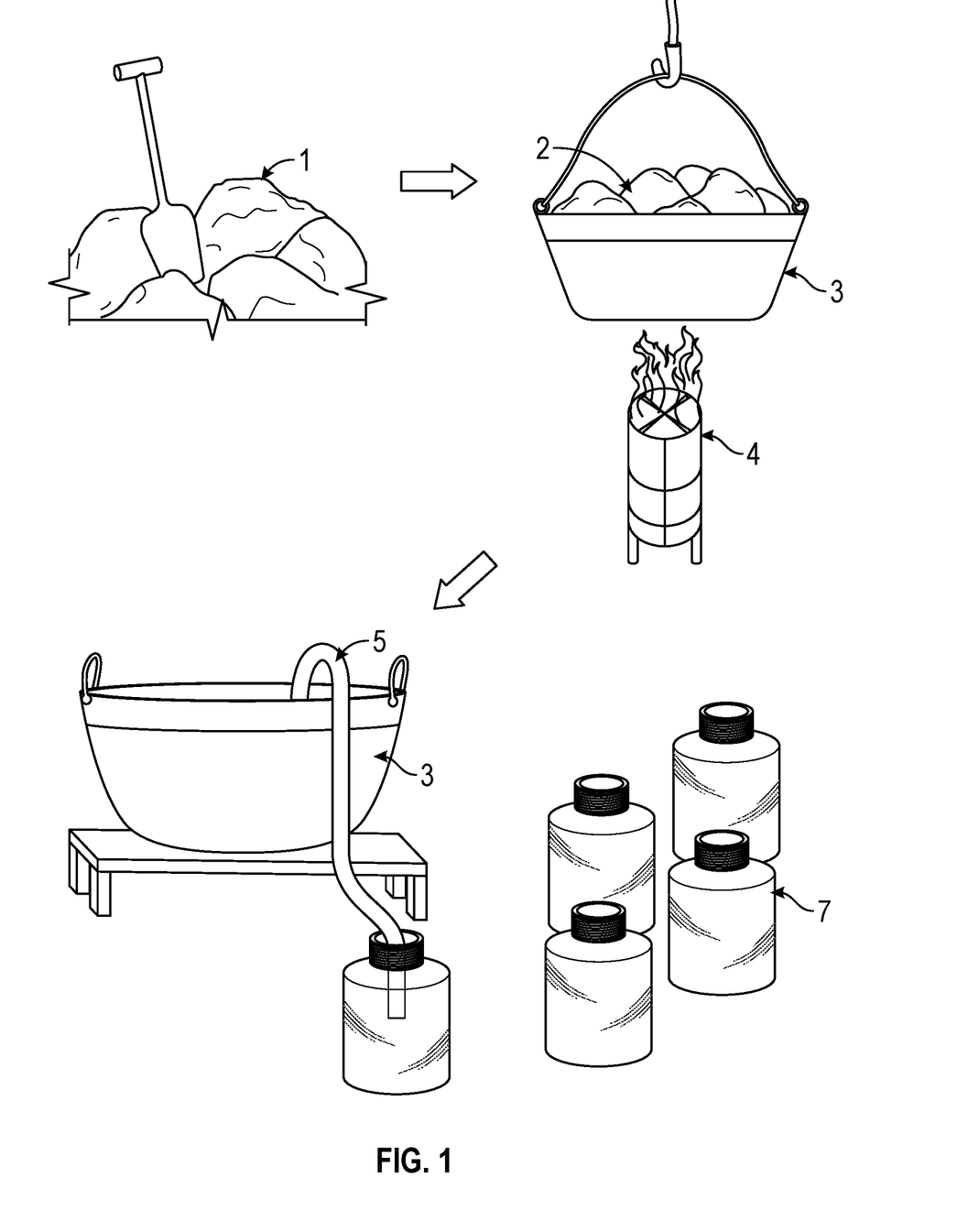
FIG. 1 depicts a pictorial illustration of a method for collecting usable water for electrolysis from melted snow.
Figure 2:
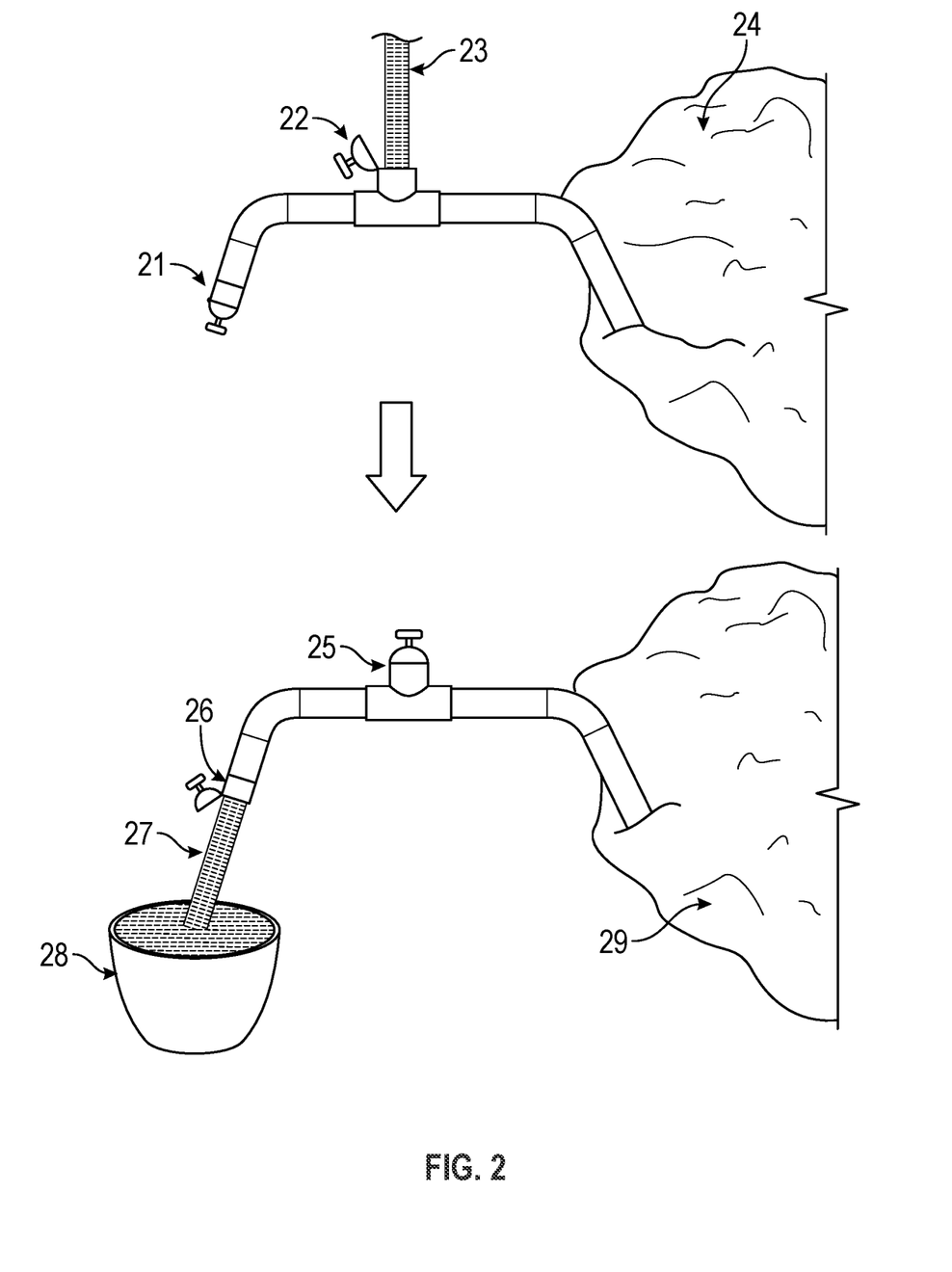
FIG. 2 depicts a pictorial illustration of a method for collecting usable water for electrolysis using one or more valves coupled to a body of water.
Figure 3:
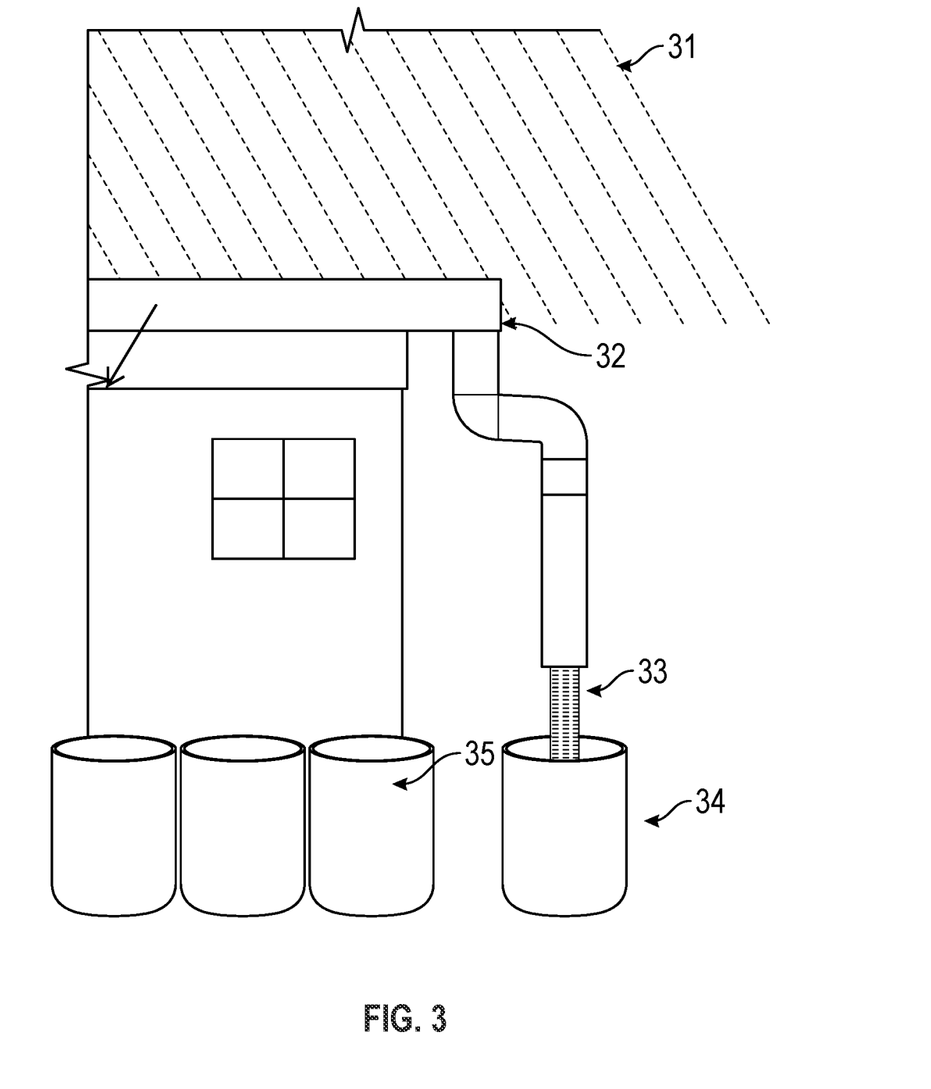
FIG. 3 depicts a pictorial illustration of a method for collecting usable water for electrolysis using collected rain.

The present invention relates to better way to produce hydrogen fuel from various common sources of water, as shown in FIGS. 1-3. As stated by Peter Byrley "[h]ydrogen production is expensive and energy-intensive. Industrial production by hydrogen requires high temperatures, large facilities and an enormous amount of energy. In fact, it usually comes from fossil fuels like natural gas and therefore isn't actually a zero-emission fuel source."

Figure 4:
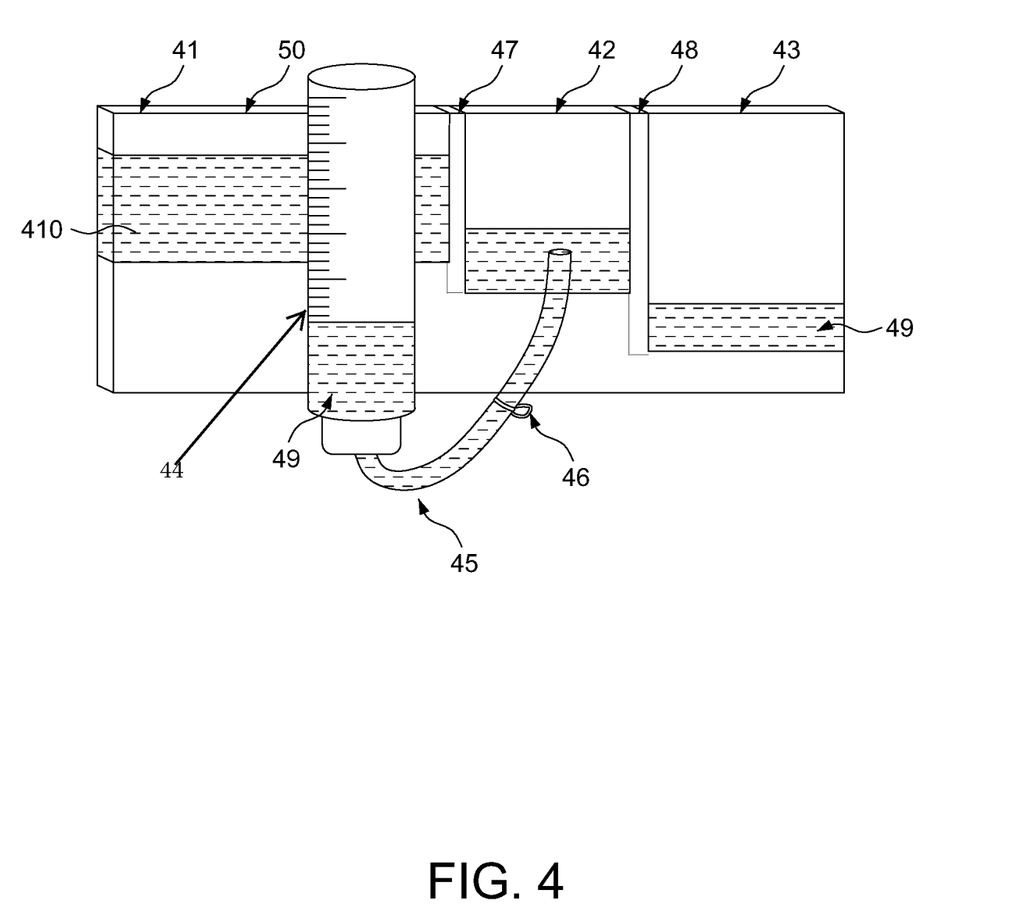
FIG. 4 depicts a pictorial illustration of an example for an electrolysis apparatus having three basins.
Figure 5:
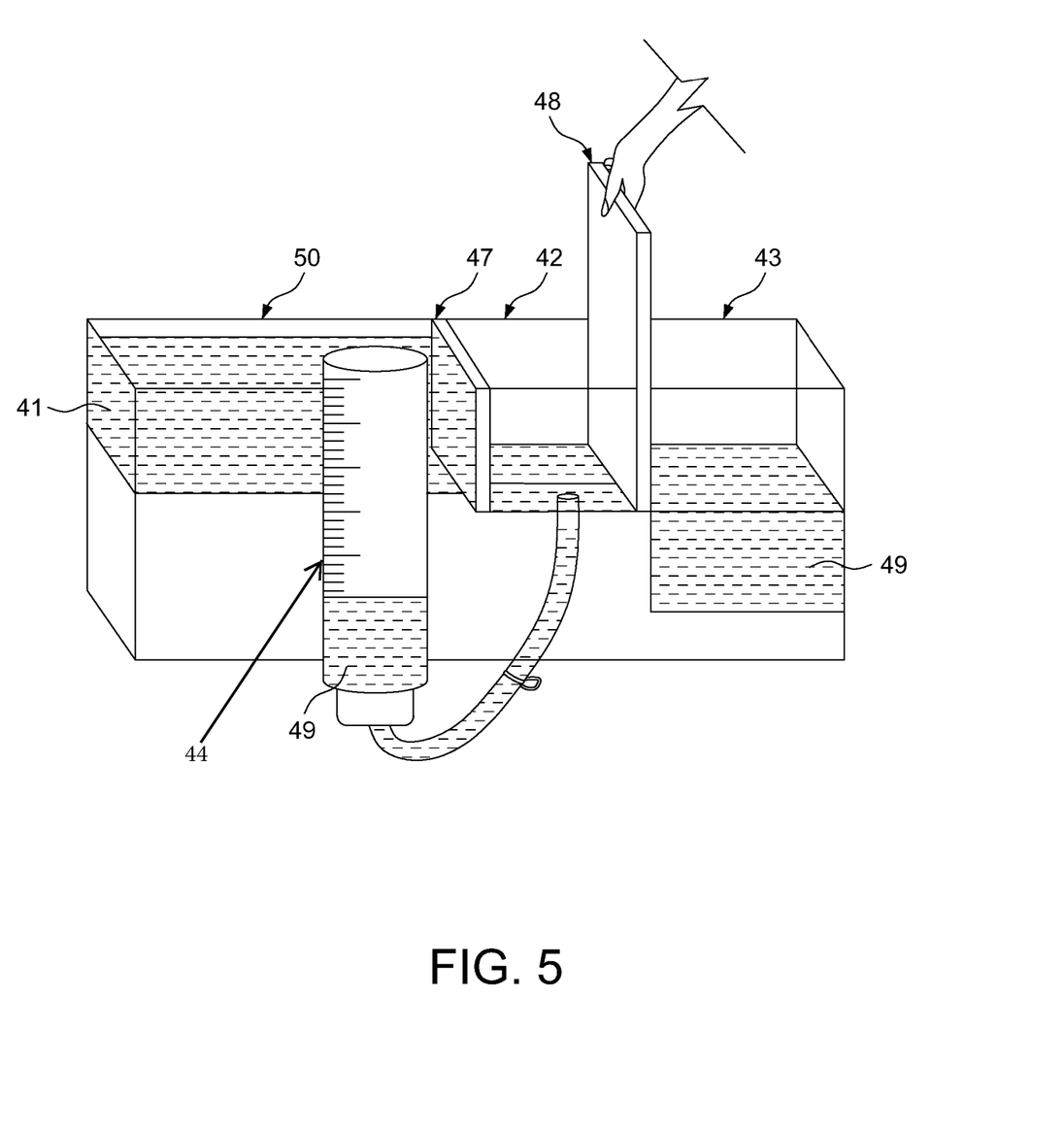
FIG. 5 depicts a pictorial illustration of the electrolysis apparatus with a cylinder tube for measuring a correct amount of solution for electrolysis and an exemplary illustration for how one of the locks may be lifted to release water into a lower basin
Figure 6:
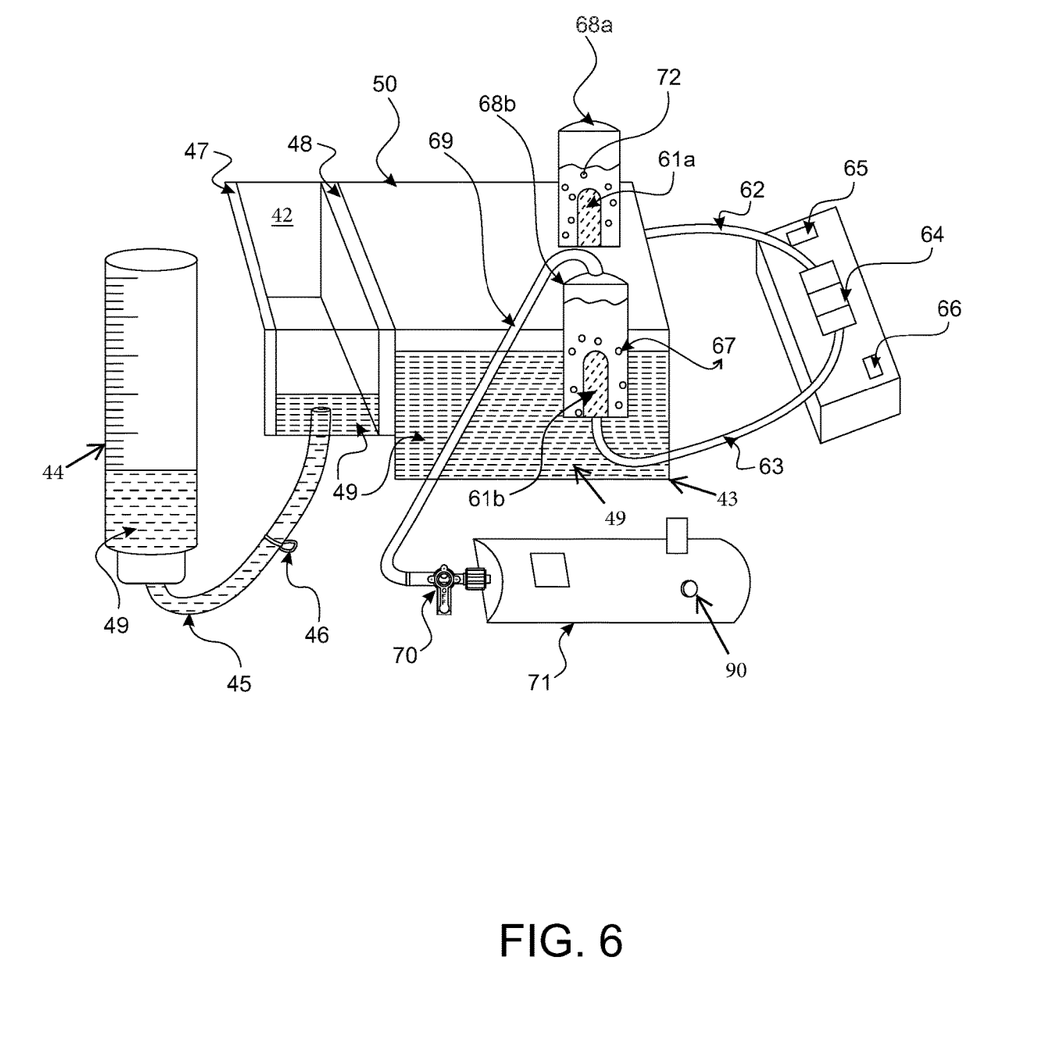
FIG. 6 depicts a partial pictorial illustration of the second and third basin of the electrolysis apparatus with the power supply coupled to the electrolysis apparatus and a cathode storage tube for containing the hydrogen gas created by electrolysis in the electrolysis apparatus.

The present invention provides an inexpensive method for the average consumer to have portable hydrogen fuel from a zero-emission fuel source. Such an invention of an electrolysis efficiency canal basin 50, as shown in FIGS. 4-6, greatly helps provide significant progress toward a clean-energy future. The method used with the electrolysis efficiency canal basin 50 to produce hydrogen (H+) out of water is electrolytic reductions or electrolysis. Electrolysis is the decomposition of an electrolyte (e.g., $H^+$ and $O^-$) by the passage of electricity through an aqueous solution of the electrolyte (e.g., as shown in FIGS. 4-6). Further, carbon electrodes 61a and 61b, as shown in FIG. 6, are used in an electrolysis process due to their competence as a conductor and the number of free electrons they have available for transfer, low cost, longevity and ease of procurement. An external voltage drives the reaction using a battery 64, as shown in FIG. 6, that powers the electrolysis process. The electrolysis process implemented in the electrolysis efficiency canal basin 50 involves the carbon electrodes 61a and 61b are suspended in water or electrolytes (e.g., saltwater 49 shown in FIG. 4-6) with electrical currents passing through the water or electrolytes. As a result, the elements making up the water, such as hydrogen and oxygen, become ionized and separate into positively and negatively charged ions.

In a non-limiting embodiment, the collected electrons and ions of hydrogen are stored in a cathode storage tube such as cathode storage tube 71 shown in FIG. 6. In a non-limiting embodiment, the cathode storage tube 71 may be made of aluminum metal. The cathode storage tube 71 may have an auto-shut-off mechanism that can trigger shutting off the entrance of the cathode storage tube 71 when the cathode storage tube 71 is filled with hydrogen gas. Further, a vacuum pipe or hose or other type of conduit 720, as shown in FIG. 7, can be attached to one end of the cathode storage tube 71 to transfer the collected hydrogen gas 67 (e.g., represented in FIG. 6) to the portable gas tank 730, as shown in FIG. 7.

Figure 7:
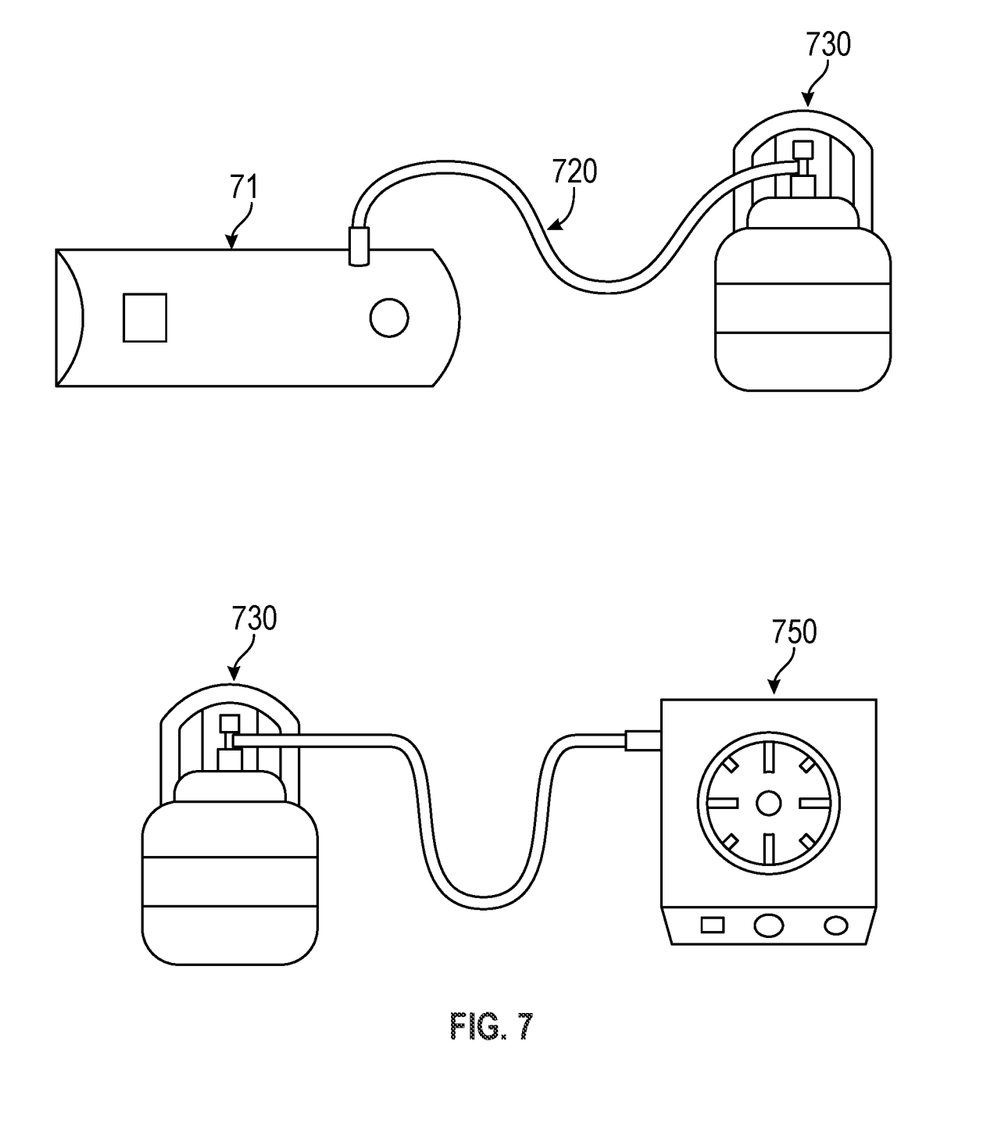
FIG. 7 depicts a pictorial illustration of an exemplary process for transferring the hydrogen stored in a cathode storage tube to a container for holding the hydrogen.

As stated above, it is an object of the present invention to provide the ability to obtain a portable gas tank 730, as shown in FIG. 7, full of inexpensive portable hydrogen fuel with zero-emission fuel source that utilizes water from snow, seawater, water from lakes and rivers, from rainfall and water from the faucet or other sources. Water from snow, seawater, water from lakes and rivers, rainfall are all abundant renewable resources for hydrogen fuel production. FIGS. 1-3 depict various illustrations for how water from snow, seawater, lakes and rivers, rainfall, and/or faucets may be collected to produce water to use to fill the electrolysis efficiency canal basin 50 shown in FIGS. 4-6.

FIG. 1 shows an example of how snow 1 on a mountain or another location may be collected and held as collected snow 2 in any type of container 3 (e.g., galvanized metal basin) and melted using fire 4 or other means of melting the collected snow 2 to produce water. In a non-limiting embodiment, a siphon 5 may be used to siphon the melted collected water 2 in the container 3 into various water storage containers 7, as shown in FIG. 1.

FIG. 2 shows an example of how a collection of pipes and valves may be used to transport water 23 from various bodies of water 24, such as lakes, rivers, seas, stormwater, or streams 27, to various containers 28 that may be used to collect the water 23. The water 23 may be piped directly from various bodies of water 24, via one or more pipes through various ports 22 and valves 21 to be dispensed into containers 28 for holding the water 23, as shown in FIG. 2.

FIG. 3 shows an example of how rain 31 may be collected into containers 34 to fill with water 33 from the collected rainfall 31, which is another way in which water 33 may be obtained for use with an electrolysis apparatus 50 to produce hydrogen fuel. In a non-limiting embodiment, the container 34 may even be positioned underneath gutters 32 of a person's home to easily collect any rainfall 31. Thus, there are many ways in which average people, depending on where they live and their geographic region, can gather water that can be poured into the electrolysis apparatus 50 shown in FIGS. 4-6 to produce hydrogen fuel.

In a non-limiting embodiment, the method described herein involves the use of carbon electrodes 61a and 61b, as shown in FIG. 6, suspended directly in water (e.g., obtained easily and efficiently from various sources as shown above in FIGS. 1-3). Sodium or NaCL may be added to the water in the electrolysis apparatus 50 in order for electrolysis to occur so that the electrolysis can occur in water, and preferably, saltwater 49. Electrolysis uses electricity to split the saltwater 49, shown in FIG. 5, into its respective components to ultimately separate out the hydrogen positive ions from the negative oxygen ions. The carbon electrodes 61a and 61b mix in saltwater 49, as shown in FIGS. 4-6, with an electrical current passing through it. As a result of this electrolysis, positively charged ions flow towards the negatively charged cathode 61b while the negatively charged ions are attracted to the positively charged anode 61a and lose electrons. Electrolysis is an example of a redox reaction where an external voltage drives the reaction. As shown in FIGS. 4-6, the electrolysis provided by the electrolysis basin 50 may be a battery powered electrolytic process.

Collecting pure hydrogen from water is a slow process but the other option to collect more electrons faster requires the addition of ions such as sodium chloride (NaCl). Sodium chloride dissolved in water are added in water (e.g., saltwater 49 as shown in FIG. 5) that can be electrolyzed. Driven by an external source of voltage, hydrogen ions flow to the cathode to combine with electrons to produce hydrogen gas 67, as shown in FIG. 6, in a reduction reaction. On the other hand, OH− ions flow to the anode to release electrons and hydrogen (H+) ion to produced oxygen gas 72, as shown in FIG. 6, in an oxidation reaction, water molecules are reduced to hydroxide ions (OH−) and hydrogen gas. At the cathode sodium ions are being reduced to sodium metal. Chlorine gas, hydrogen and aqueous sodium hydroxide (NaOH) solution the overall results.

Getting Hydrogen from Snow is an Inexpensive Renewable Resource

Winter is associated with snow and freezing temperature. Snow affects human activities and ecosystem. The liquid equivalent of snowfall maybe evaluated using a snow gauge or with a standard rain gauge, adjusted for winter by removal of a funnel and inner cylinder. Both types of gauges meet the accumulated snow and report the amount of water calculated.

People living in states with abundant snow such as in Washington, Chicago, Oregon, Utah, Alaska, New York, Michigan, Idaho among others and as far as Siberia, Nepal can produce their own hydrogen fuel. The melted water from snow provides hydrogen to be usable as fuel that is economical and efficient. By providing a catalyst that can be used in the electrolysis process to extract hydrogen from water hydrogen gas can produced, which is a completely clean and renewable source of energy.

Notably, various inexpensive renewable resources of hydrogen in the form of water may be found from a variety of sources of water, including from the sea, lakes and rivers, rainfall and stormwater. These abundant resources are available to people to produce hydrogen out of water and use the collected hydrogen gas as their fuel in cooking and warming the inside of their homes. Water from the faucet who have it at their homes can collect hydrogen utilizing the water as renewable resource of energy.

The top ten coldest countries in the world that produce huge amount of snow due to the wrath of the severe winter are as follows: Antarctica, Russia, Canada, Kazakhstan, The United States of America, Greenland, Iceland, Mongolia, Finlad and Estonia. List of top eleven countries with most rainfall in the world are as follows: Columbia, Sao Tome, Papua New Guineas, Solomon Island, Panama, Costa Rica, Malaysia, Brunei, Indonesia, and Bangladesh.

It is also an object of the present invention to offset the rising greenhouse gas concentration in the atmosphere of the planet. The rising greenhouse concentrations affect the global temperature and caused the warming of the planet.

In order to solve the above-mentioned problem a portable hydrogen fuel with zero-emission fuel source is invented to provide the average consumers with a portable hydrogen fuel for use in their cooking. Burning of wood and biomass use as fuel for cooking and fireplaces causes greenhouse emissions. The consequences of widespread use of burning of wood and biomass as heating stove have an impact to the environment such as increase of greenhouse emissions and destruction of biodiversity of flora and fauna dependent on forests. There are fifteen countries listed as heavy users of biomass in Africa, two in Central American countries (Haiti and Guatemala), and three in Asian countries (Nepal, Cambodia, and Myanmar).

As Stated in WorldFacts by Vijayalaxmi Kinhal of World Atlas

What is Biomass? Which Countries Burn the Most Biomass?

"Ever since humanity harnessed the power of fire it has depended upon it to cook, stay warm, and provide energy for other uses. Though many parts of the third world, the traditional practice of burning biomass and waste to produce heat and other forms of energy continues to help meet the need of such arising from a lack of reliable modern energy services. Though lower income regions are beginning to use more modern forms of energy, biomass and waste still remain a common source of energy, and account for 14% of world wide energy output."

Areas where Biomass and Waste are Used as a Primary Source of Energy

"Wood, forestry residue, animal dung, human excrement, and agricultural residues in the form of crop waste like stalks and coconut husks are used. Those these are renewable energy sources, the stoves used for burning these have an energy efficiency of only 10%, so 90% of the biomass burnt is wasted. Most of the biomass is used as the primary energy source by people for heating and cooking, ranging from 65% in Haiti, 72% in Kenya, 78% in Democratic Republic of Congo, 81.5% in Nigeria, 85% in Tanzania, to 89% in Kenya and Niger. In all the countries, rural households are more dependent on biomass then peri-urban and urban areas for cooking. Its use in rural households varies in different countries, from 99% of the population in Ethiopia, to 95% in Mozambique. While in urban Ethiopia biomass is used by 84% of the population. In addition, 12% and 6% of the biomass is used for transportation in Haiti and Nepal, respectively. Industrial use of biomass for heating is prevalent in Haiti (4%), Nepal (6%), Myanmar (20%) and Sudan (20%). These usually scale industries like sugar mills, sawmills, bricks production, and tobacco curing. Other uses of biomass are commercial services like restaurants, and baking as well as art and crafts. Nepal also uses 1% of its wood in agriculture."

The Consequences of Widespread Biomass Energy Use

"The effects of biomass use impact the well being of both people and the environment.

1) Health Issues

Burning wood and waste indoors for cooking on the traditional stoves produces more smoke than heat. On the long term smoke inhalation is hazardous to health, causing lung diseases.

2) Environmental Issues

People cut down trees in an unregulated manner, without being accompanied by reforestation to replace the lost forests, leading to widespread deforestation:

(a) Deforestation results in land degradation, as the bare soil is subject to water and wind erosion. Moreover, all of the 20 countries that are heavy users of biomass lie in the tropics. In tropical climate waste biomass is decomposed rapidly to form organic matter, due to the ideal temperatures and humid. These ideal climatic conditions also help plants to grow trees grow fast using the nutrients, so most of the nutrients in a tropical system are locked in the trees and not present in the soil. When trees are cut and removed, these nutrients no longer circulate in that ecosystem, leading to impoverishment of the soil.

(b) All forests are important carbon sinks, and prevent climate change However, the rapidly growing tropical forests are particularly suited to absorb the carbon dioxide in the atmosphere so loss of tropical forests contributes to increased levels of greenhouse gases.

(c) Burning of wood and waste causes pollution and increasing greenhouse gas emissions.

(d) Deforestation results in the loss of precious biodiversity of flora and the fauna dependent on the forests.

(e) Animal dung and crop residues have alternate use as manure for agriculture so heavy reliance on the agricultural waste for energy, ultimately decreases farm productivity, adding to poverty."

Other Regions Dependent on Traditional Biomass for Fuel

"Traditional biomass as fuel is the strongest in Africa, where the extraction of wood from forests and savannas is seen more fuel than for timber. 15 out of 20 countries listed as heavy users of biomass are in Africa. Two central American countries, Haiti (81%), and Guatemala (62.8%), and three Asian countries, Nepal (80.6%), Cambodia (66.9%), and Myanmar (65.3%), also depend heavily on biomass."

There are multiple countries that are turning waste and biomass into energy, including but not limited to Ethiopia, DR Congo, Tanzania, Nigeria, Haiti, Nepal, Togo, Mozambique, Eritrea, Zambia, Ivory Coast, Niger, Kenya, Cambodia, Myanmar, Cameroon, Sudan, Guatemala, Zimbabwe, and Republic of Congo. (as obtained from the World Atlas World Facts published Mar. 18, 2019). The use of biomass in the form of wood greatly contribute to greenhouse emissions causing global warming of the planet. There is a great need and it is desirable for such countries, and other countries worldwide, including the United States which is a leading contributor of global warming greenhouse emissions, to have an electrolysis basin 50 that can be used to produce hydrogen gas from water and to use the hydrogen gas as a source of fuel for various home electronic devices (e.g., 750 as shown in FIG. 7) and used by an average person or home without a great deal of difficulty.

FIG. 4 shows an example of an electrolysis apparatus 50 for conducting electrolysis at a home or other property of a user. In a non-limiting embodiment, the electrolysis apparatus 50 may be made up of acrylic plastic or plexiglass. The apparatus 50 may also be referred to as an "electrolysis efficiency canal basin." In a non-limiting embodiment, the electrolysis apparatus 50 includes in a non-limiting embodiment three basins, including a first basin 41, a second basin 42, and a third basin 43. In a non-limiting embodiment, the first basin 41 may be the biggest sized basin, while the second basin 42 may be the smaller sized basin, and the third basin 43 may be the medium sized basin. In a non-limiting embodiment, there is a first partition 47 dividing the first basin 41 from the second basin 42, whereby the first partition lock 47 can be raised and lowered as needed. Further, there may be a second partition 48 dividing the second basin 42 from the third basin 43 that can be raised and lowered (e.g., as shown in FIG. 5). The first partition 47 and the second partition 48 can be raised when needed in order to allow a first amount of water, such water 410 shown in FIG. 4, to flow down from the first basin 41 to the second basin 42 and/or third basin 43 when either the first partition 47 and/or the second partition 48 are raised. The water 410 can mix with the saltwater 49 from a measuring tube 44 to provide the correct amount of saltwater into the third basin 43.

Further, as shown in FIG. 4, the first basin 41 is positioned elevated or above the second basin 42 located in the middle or between the first basin 41 and the third basin 43. The second and middle basin 42 is positioned above the third basin 43. Accordingly, the electrolysis apparatus 50 may be manufactured such that the first basin 41, second basin 42, and third basin 43 have bottom surfaces that are not level with each other. Rather, the first basin 41 is formed to be higher than the second basin 42, which is formed to be higher than the third basin 43 in a stepped arrangement as shown in FIG. 4. As noted above, this may allow the flow of saltwater 410 as well as any solute 49 from the measuring tube or beaker 44 to flow down as needed into the third basin 43 in order to add any saltwater needed for the electrolysis reaction to completely occur.

In a non-limiting embodiment, connected to the electrolysis apparatus 50 is a measuring tube 44. The measuring tube 44 is an upright measuring tube containing saltwater 49. As shown in an exemplary embodiment in FIG. 4 and in FIG. 5, the measuring tube 44 may be cylindrical shaped, but other shapes are useable as well. Lock 46 may act as a lock or a stop or valve on the conduit 45 to prevent or control saltwater 49 from flowing from the measuring tube 444 to the second basin 42 or third basin 43. When the user wants the saltwater 49 to flow, the lock 46 may be removed or loosened to allow the saltwater 49 to flow into the electrolysis apparatus 50 and into the second basin 42 as shown in a non-limiting embodiment.

The measuring tube 44 may be connected to one of the basins 41, 42, 43 of the electrolysis apparatus 50 with a connecting hose 45 or other type of conduit. In a non-limiting embodiment, as shown in FIG. 4, the hose 45 is connected to the middle or second basin 42 of the electrolysis apparatus 50, which as noted above may be the smaller sized basin 42.

In a non-limiting embodiment, the electrolysis apparatus 50 is used to conduct electrolysis to split the components into hydrogen gas among other components (e.g., chlorine gas and aqueous sodium hydroxide (NAOH) solution). In a non-limiting embodiment, the user controls the amount of NaCL and water that flows into the third basin 43, which is utilized during the electrolysis process for the reduction reaction to produce hydrogen gas 67 and the oxidation reaction to produce oxygen gas 72 as shown in FIG. 6.

In a non-limiting embodiment, the measuring tube 44 contains dissolved NaCL in water, in order to direct saltwater into the electrolysis apparatus 50. The first basin 41 may continue a reserve amount of water as well so that additional water can be added to the third basin 43 as needed by raising the partitions 47 and 48 and adding a desired amount of water from the first basin 41, which moves down into the second basin 42 and then the third basin 43.

In a non-limiting embodiment, it is possible that a user procures water for mixing salt (NaCL) in the measuring tube 44 to provide saltwater 49 to the electrolysis apparatus 50, as shown in FIGS. 4-6. In a non-limiting embodiment, the user can obtain water using any of the natural ways shown in FIGS. 1-3. The saltwater 49 in the measuring tube 44 that is transferred first to a medium basin 42 and then the third basin 43 (e.g., via gravity when the second partition 48 is raised) is an aqueous solution that also acts as a buffer solution. The needed buffer solution made up of saltwater 49 helps generate an electric field during the process of electrolysis, and may be composed of 90% water and 10% NaCl or salt. For example, for every 100 ml, the buffer solution i.e., saltwater 49, may be composed of 90% water and 10% NaCl (salt).

In a non-limiting embodiment, the user may conduct an Acid-Base titration after water 410 from the big basin 41 is added to the small basin 42 and allowed to mix with the saltwater 49. In this way, the user can check how much water has been added to dilute the required buffer solution. For example, the user may use a pH tool indicator as an acid-base indicator to determine a strong base titration (e.g., pH greater than 7). An example of a pH tool indicator is the pH meter of aqueous media. In a non-limiting embodiment, the mixture maintained in the solution is based on the Henderson-Hasselbach equation for an acid-base buffer solution:

$$pH = pKa + Log\ 10(\{salt\})/(\{acid\}))$$

It is recommended that for the electrolysis apparatus 50, a strong titration is required for an effective water splitting that requires a voltage of 1.23 v at a pH greater than 7.

As noted above, the user may add a required amount of NaCL (e.g., 10%) and water (e.g., 90%) for every 100 mL of solution to produce the saltwater 49 utilized and necessary for the electrolysis reaction or process that is meant to occur in the third basin 43 in a non-limiting embodiment. In other embodiments, the electrolysis apparatus 50 may be configured differently so that the electrolysis reaction may occur in another basin other than the third basin 43. In a non-limiting embodiment, it is noted that the third basin 43, where the electrolysis occurs, may include a lid.

FIG. 6 is a partial view of the electrolysis apparatus 50 that shows in greater detail the electrolysis process and how it may occur in the third basin 43, according to one or more non-limiting embodiments. In a non-limiting embodiment, there may be a first carbon electrode 61a and a second carbon electrode 62a each covered respectively by container tubes 68a and 68b. In a non-limiting embodiment, the carbon electrodes 61a and 61b have opposite charges. In a non-limiting embodiment, the carbon electrodes 61a and 61b can be made of either mantle peridotite based-activated carbon or from graphite carbon. In a non-limiting embodiment, the container tubes 68a and 68b are made of glass so as to be able to contain the produced oxygen gas 72 and hydrogen gas 67 that is produced as a result of the electrolysis, but other materials may also be used for the containers 68a and 68b in one or more non-limiting embodiments. Mantle peridotite based activated carbon electrodes, which may be advantageous to use for the carbon electrodes 61a and 61b in one or more non-limiting embodiments, may be derived or made from mantle peridotite rocks, cells or solar cells made from mantle peridotite rocks, activated carbon mantle peridotite rocks, and other mantle peridotite carbon electrodes.

Accordingly, in a non-limiting embodiment, the first carbon electrode 61a, as shown in FIG. 6, is an anode. As known in the art, during electrolysis, an anode (e.g., first carbon electrode 61a) is the electrode where oxidation occurs or where oxygen gas 72, as shown in FIG. 6, is produced. The second carbon electrode 61b, as shown in FIG. 6, may then be the cathode. As known in the art, during electrolysis, the cathode (e.g., second carbon electrode 61b) is the electrode where the reduction occurs, which means that the cathode is where the hydrogen gas 67 occurs.

The first carbon electrode 61a and the second carbon electrode 61b are submerged in the buffer solution/electrolyte 49 made of saltwater. The carbon electrodes 61a and 61b as shown in FIG. 6 serve as a catalyst to generate hydrogen gas, which can be usefully captured in the cathode storage tube 71 and then transferred to a portable gas tank 730 as shown in FIG. 7, and later used to power one or more devices or apparatuses (e.g., apparatus 750 as shown in FIG. 7).

Attached to each carbon electrode 61a and 61b, as shown in FIG. 6, is a wire that is connected to a power source or battery 64. In a non-limiting embodiment, the battery 64 may be zinc-carbon battery (e.g., National Hyper battery) 64 as shown in FIG. 6 is the source of direct electric current (DC) responsible for the breakdown of elements via electricity and an electrolysis reaction. In a non-limiting embodiment, the zinc-carbon battery 64 is a dry cell that provides direct electric current that produces a voltage of about 1.5 volts, which is the voltage that is needed for electrolysis to occur, whereby the voltage may be referred to as the decomposition potential and/or decomposition voltage. As known in electrochemistry, the decomposition potential or voltage is the difference in the electrode potential between an electrolytic cell's cathode 61b and anode 61a in order for electrolysis to occur.

A voltage regulator 65, as shown in FIG. 6, is designed and added to the circuit to keep a constant output of voltage even when the input voltage changes. The dry cell battery 64 has a zinc-anode and carbon rod of positive polarity to assist the cathode 61b that collects the current. Attached at both side ends of zinc-anode and cathode of the battery 64 are a wire 62 connecting the battery 64 to the first carbon electrode/anode 61a and then another wire 63 connecting the battery 64 to the second carbon electrode 61b/cathode to power the electrolytic reactions. In a non-limiting embodiment, the wires 62 and 63 are clipped to each carbon electrodes 61a and 61b that are submerged in the saltwater 49 inside the third basin 43 of the electrolysis efficiency apparatus 50. In a non-limiting embodiment, wire 62 represents a negative wire connected to the negative port of the battery 64 and wire 63 represents a positive wire connected to the positive port of the battery 64.

Each carbon electrode 61a and 61b is covered by container tubes 68a and 68b. The first container tube 68a covers the submerged first carbon electrode/anode 61a, while the second container tube 68b covers the submerged second carbon electrode/cathode 61b. Upon powering on the battery 64, using for example the power on/off switch 66 shown in FIG. 6, the battery 64 provides the electric current needed for electrolysis to occur when the wires 62 and 63 are connected to the anode 61a and the cathode 61b. Accordingly, when an electric field is applied to the electrolysis apparatus 50, with electrical current passing into the saltwater 49 and the carbon electrodes 61a and 61b, the result is that the hydrogen ions from the water ($H2O$) flow to the second carbon electrode/cathode 61b to combine with electrons to produce hydrogen gas in a reduction reaction. Simultaneously, the OH– ion gas flow to the first carbon electrode/anode 61a to release electrons and H+ to produce oxygen gas 72 in an oxidation reaction. Due to the presence of the sodium chloride (NaCl) dissolved in the saltwater 49, the first carbon electrode/anode 61a oxidizes the chloride ions ($Cl^-$) to chlorine gas ($Cl_2$). At the second carbon electrode/cathode 61b, instead of sodium ions being reduced to sodium metal, water molecules are reduced to hydroxide ions (OH–) and hydrogen gas ($H2$) 67 as shown in FIG. 6. The overall result after the electrolysis process occurs is the presence of chlorine gas, hydrogen gas 67, and aqueous of sodium hydroxide (NaOH) solution. The container tubes 68a and 68b, as shown in FIG. 6, hold the ionized and dilute NaCL in the water.

As shown in FIG. 6, there is a hose 69 or another type of conduit connecting an exit point of the second container tube 68b to the entrance of the cathode storage tube 71. A stopcock 70 may also be integrated with the hose 69 near the entrance of the cathode storage tube 71. The stopcock 70 is an externally operated valve regulating the flow of a liquid or gas through a pipe or hose, such as hose 69. The stopcock 70 may be turned on or off to allow the hydrogen gas 67 collected in the second container tube 68b to travel through the hose 69 to the cathode storage tube 71. When opening or activating the stopcock 70, the pressure from the ionized saltwater may force the hydrogen gas 67 from the third basin 43 of the electrolysis apparatus 50 to the cathode storage tube 71 while the spare diatomic oxygen 72 may be safely released into the surrounding air. In this manner, the electrolysis apparatus 50 can be used for personal use anywhere (e.g., a residential or commercial setting including indoor or outdoor) to provide hydrogen gas that may be used to provide power to other devices (e.g., apparatus 750 shown in FIG. 7).

In a non-limiting embodiment, the cathode storage tube 71 may be made up of aluminum metal and has an installed temperature controller 90, as shown in FIG. 6. In a non-limiting embodiment, an example of the temperature controller 90 used with the cathode storage tube 71 may be WATLOW'S PM temperature controller in a non-limiting embodiment. The temperature controller 90 can limit or control the temperature of the heat power of the cathode storage tube 71. Accordingly, the temperature controller 90 may help to prevent the build-up of excess heat in the cathode storage tube 71 as it receives and stores the hydrogen gas 67 from the third basin 43 of the electrolysis apparatus 50 (or any basin where the carbon electrodes 61a and 61b are stored and connected to the power source 65). Further, the temperature controller 90 limits or controls the temperature of heat power of the cathode storage tube 71 upon extraction or during extraction of hydrogen gas from the second container tube 68b after the electrolysis as occurred. Further, a cooling sensor indicator connected or otherwise attached to the cathode storage tube 71 can be used to check if the contents (i.e., hydrogen gas 67) has cooled down. In a non-limiting embodiment, the temperature controller 90 is set up remotely and includes a controller that can be programmed for remote access capability and fuel descriptions of parameters and error codes.

The cathode storage tube 71 may have a fully auto-shutoff mechanism when the cathode storage tube 71 is full with hydrogen gas 67. Further, the cathode storage tube 71 may be equipped with a radar device readable via USB or SD card build IDDA power ¼" 20 thread to 6AA battery. In a non-limiting embodiment, the radar device is an electronic device called ATG or automatic tank gauge from ATG System. This small radar device may be attached to the cathode storage tube 71 whose basic function is to monitor the fuel level in the cathode storage tube 71 over a period of time. When the proper fill level of hydrogen gas 67 is reached and shuts-off the flow of hydrogen gas 67, the radar may be able to indicate or otherwise report that the cathode storage tube 71 is filled to capacity with hydrogen gas 67.

A separate task scheduler app can be set up in a smart device such as one's smartphone or laptop to monitor and notify a use when tasks such as the start of the transfer process and the finish process when the cathode storage tube 71 is full has occurred. In a non-limiting embodiment, the cathode storage tube 71 further includes an indicator light to indicate when the cathode storage tube 71 is full, in addition to the radar device.

A user's laptop or smartphone can be connected via an application to monitor the cathode storage tube 71 via a network connection. For example, a sim card may be placed in a designated slot of the cathode storage tube 71 to connect it to the user's laptop or other smart device. Further, WIFI temperature moisture controller can be utilized to control the temperature heat during the process of electrolysis.

In a non-limiting embodiment, the hydrogen gas 67 stored in the cathode storage tube 71 may be transferred via a conduit or hose 720, as shown in FIG. 7, to a small portable gas tank 730. A gas tank gauge can be used to monitor pressure, and can include an indicator moves into low gas, or refill areas. The portable gas tank 730 may be ready to use as a fuel source for various apparatuses, including apparatus 750, which may be a stove in an exemplary embodiment. Of course, the hydrogen gas 67 stored in the portable gas storage tank 730 may be used for a variety of other personal and/or commercial apparatus to provide a fuel source. It is noted that in alternative embodiments, the hydrogen gas (H2) may be collected directly in a portable gas storage tank 730 rather than initially being collected in the cathode storage tube 71, and then transferred to the portable gas storage tank 730. In such a scenario, the hose 69 may be connected from the second gas container 68b to the entrance of the portable gas storage tank 730, rather than to the cathode storage tube 71.

Advantageously, as noted above, hydrogen gas 67 produced from the electrolysis apparatus 50 using non-polluting elements such as salt (NaCL) and water, is a zero-emission fuel source which ideally will decrease levels of greenhouse emission and ultimately decrease poverty also.

The burning of woods, biomass, and combustible waste in the traditional stove that produces smoke pollution should be stopped. It may be preferable that people instead use a stove burner 750 or other devices, as shown in FIG. 7, that use hydrogen gas 67 provided from the electrolysis apparatus 50 with zero-emission fuel source that is inexpensive because the renewable resources, such as water, which is more readily abundant, can be found everywhere, and is more accessible. As stated earlier, water as a renewable resource may be obtained by melting snow and/or collecting water from the sea, lakes and rivers, rainfall, and stormwater. Many other benefits and advantages are provided by the electrolysis efficiency apparatus 50.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for hydrogen gas generation by electrolysis, the method comprising:
   providing an electrolysis apparatus, wherein the electrolysis apparatus comprises:
   a first basin, a second basin, and a third basin;
   a first partition, and a second partition, wherein the first partition separates the first basin from the second basin, and the second partition separates the second basin from the third basin, wherein the first basin is elevated above the second basin and the second basin is elevated above the third basin,
   wherein the third basin further comprises;

a first carbon electrode, wherein the first carbon electrode is an anode;
a second carbon electrode, wherein the second carbon electrode is a cathode;
a first container covering the first carbon electrode;
a second container covering the second carbon electrode, wherein the first container and the second container are separate from each other;
a cathode storage tube connected to the second container by a conduit, wherein the conduit comprises a stopcock positioned near an entrance of the cathode storage tube, wherein the conduit connects an exit opening of the second container covering the second carbon electrode to the entrance of the cathode storage tube; and
a power source electrically connected to the first carbon electrode and to the second carbon electrode when located in the third basin and beneath the first container and the second container;
connecting a positive end of the power source to one end of the first carbon electrode located in the third basin;
connecting a negative end of the power source to one end of the second carbon electrode located in the third basin;
providing saltwater to the third basin containing the first carbon electrode covered by the first container and the second carbon electrode covered by the second container and submerging the first carbon electrode and the second carbon electrode with the saltwater;
powering on the power source in order to apply direct current for electrolysis to occur in the electrolysis apparatus;
as a result of the powering on the power source and the electrolysis occurring in the electrolysis apparatus, producing oxygen gas as a result of the oxidation reaction and producing hydrogen gas as a result of the reduction reaction,
wherein the first container covering the first carbon electrode contains the oxygen gas and wherein the second container covering the second carbon electrode contains the hydrogen gas;
transferring the hydrogen gas to the cathode storage tube through the conduit upon opening or activating the stopcock; and
collecting the hydrogen gas in the cathode storage tube until the cathode storage tube is full of the hydrogen gas produced from the electrolysis apparatus.

2. The method of claim 1, further comprising, storing the hydrogen gas in the cathode storage tube.

3. The method of claim 1, further comprising, connecting a portable gas tank to the cathode storage tube and transferring the hydrogen gas from the cathode storage tube to the portable gas tank.

4. The method of claim 3, further comprising, connecting the portable gas tank to another device or apparatus or item that can use the hydrogen gas in the portable gas tank as a fuel source.

5. The method of claim 1, further comprising:
filling the first basin with water;
lifting the first partition so that a first amount of water fills the second basin;
adding the saltwater from a measuring tube to the second basin so that the saltwater and the first amount of the water mix together to form a second amount of saltwater; and
lifting the second partition so that the second amount of the saltwater fills the third basin in order to provide a correct amount of the saltwater within the third basin for the electrolysis to occur.

6. The method of claim 5, wherein the measuring tube is coupled to the second basin with a conduit.

7. The method of claim 1, wherein the cathode storage tube comprises an auto-shut off mechanism that becomes triggered when the cathode storage tube is full of the hydrogen gas.

8. The method of claim 1, wherein the first carbon electrode and the second carbon electrode comprise mantle peridotite based-activated carbon electrodes.

9. The method of claim 1, wherein the first carbon electrode and the second carbon electrode comprise graphite electrodes.

10. A system for using an electrolysis apparatus, comprising:
the electrolysis apparatus, wherein the electrolysis apparatus comprises:
a first basin, a second basin, and a third basin;
a first partition separating the first basin from the second basin;
a second partition, wherein the second partition separates the second basin from the third basin,
wherein the first basin is elevated above the second basin and the second basin is elevated above the third basin,
wherein the third basin further comprises;
a first carbon electrode, wherein the first carbon electrode is an anode;
a second carbon electrode, wherein the second carbon electrode is a cathode;
a first container covering the first carbon electrode;
a second container covering the second carbon electrode, wherein
the first container and the second container are separate from each other;
a cathode storage tube;
a conduit having a stopcock positioned near an entrance of the cathode storage tube, wherein the conduit connects an exit opening of the second container to the entrance of the cathode storage tube;
and a power source electrically connected to the first carbon electrode and to the second carbon electrode,
wherein hydrogen gas created after electrolysis is allowed to occur in the third basin is configured to be transferred from the second container covering the second carbon electrode via the conduit to the cathode storage tube for storage of the hydrogen gas in the cathode storage tube.

11. The system of claim 10, wherein the cathode storage tube comprises an auto-shut off mechanism that becomes triggered when the cathode storage tube is full of hydrogen gas.

12. The system of claim 10, wherein the cathode storage tube further comprises a temperature controller.

13. The system of claim 10, wherein the cathode storage tube further comprises a radar device for indicating when the cathode storage tank is full of hydrogen gas.

14. The system of claim 10, wherein the first carbon electrode and the second carbon electrode comprise mantle peridotite based-activated carbon electrodes.

15. The system of claim 10, wherein the first carbon electrode and the second carbon electrode comprise graphite electrodes.

16. The system of claim 10, wherein the power source is a battery.

17. The system of claim 10, wherein the first container and the second container are glass containers.

\* \* \* \* \*